United States Patent [19]

Bawa et al.

[11] Patent Number: 5,059,747
[45] Date of Patent: Oct. 22, 1991

[54] CONNECTOR FOR USE WITH METAL CLAD CABLE

[75] Inventors: Jaspal S. Bawa, Neshanicsta; Luis Couto, Hillside; Giacomo F. Mancini, Piscataway; Nicholas Pulitano, Livingston; George S. Zabrodski, Iselin, all of N.J.

[73] Assignee: Thomas & Betts Corporation, Bridgewater, N.J.

[21] Appl. No.: 447,738

[22] Filed: Dec. 8, 1989

[51] Int. Cl.$^5$ ............................................. H02G 3/22
[52] U.S. Cl. .................................................. 174/65 SS
[58] Field of Search .................... 174/65 SS, 51, 78

[56] References Cited

U.S. PATENT DOCUMENTS

| | | | |
|---|---|---|---|
| 3,079,182 | 2/1963 | Appleton | 285/343 |
| 3,739,076 | 6/1973 | Schwartz | 174/78 |
| 3,744,007 | 7/1973 | Horak | 174/78 X |
| 4,022,966 | 5/1977 | Gajajiva | 174/65 SS |
| 4,273,405 | 6/1981 | Law | 439/462 |
| 4,334,121 | 6/1982 | Kutnyak | 174/68 |
| 4,481,697 | 11/1984 | Bachle | 24/135 |
| 4,490,576 | 12/1984 | Bolante et al. | 174/65 SS |
| 4,513,172 | 4/1985 | Matsui | 174/65 SS |
| 4,515,991 | 5/1985 | Hutchison | 174/65 SS |
| 4,606,562 | 8/1986 | Saraceno | 285/159 |
| 4,608,454 | 8/1986 | Lackinger | 174/65 SS |
| 4,629,825 | 12/1986 | Lackinger | 174/65 SS |
| 4,692,561 | 9/1987 | Nattel | 174/65 SS |
| 4,692,562 | 9/1987 | Nattel | 174/65 SS |
| 4,692,563 | 9/1987 | Lackinger | 174/65 SS |
| 4,738,636 | 4/1988 | Bolante | 439/462 |
| 4,739,126 | 4/1988 | Gutter et al. | 174/65 SS |
| 4,789,759 | 12/1988 | Jones | 174/65 SS |

FOREIGN PATENT DOCUMENTS 1197423  7/1970  United Kingdom .

Primary Examiner—Leo P. Picard
Assistant Examiner—David A. Tone
Attorney, Agent, or Firm—Robert M. Rodrick; Salvatore J. Abbruzzese

[57] ABSTRACT

A connector for terminating an electrical cable having a conductive sheath is disclosed. The connector includes a gland for receipt of the cable and a gland nut securable to the connector gland. Sealing structure supported between the gland and the gland nut effects a seal between the gland and the cable upon screw attachment of the gland nut to the gland. A sheath ground provides ground connection of the sheath to the connector upon initial insertion of the cable into the connector and also provide permanent mechanical and electrical connection between the sheath and the connector upon tightening of the gland nut to the gland.

17 Claims, 4 Drawing Sheets

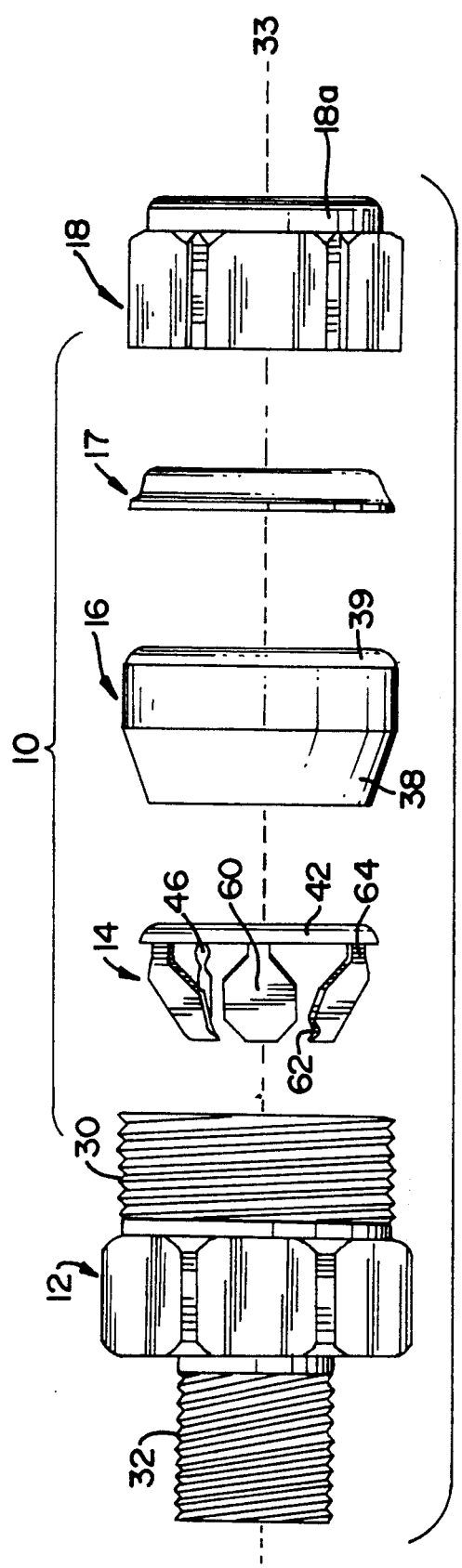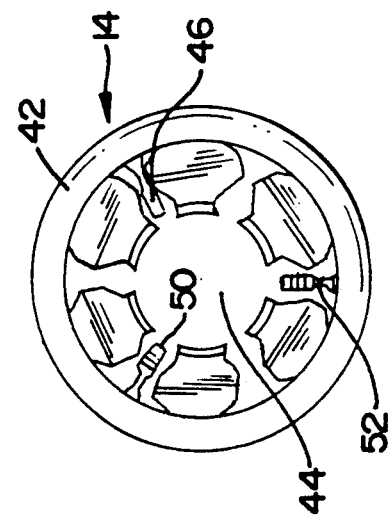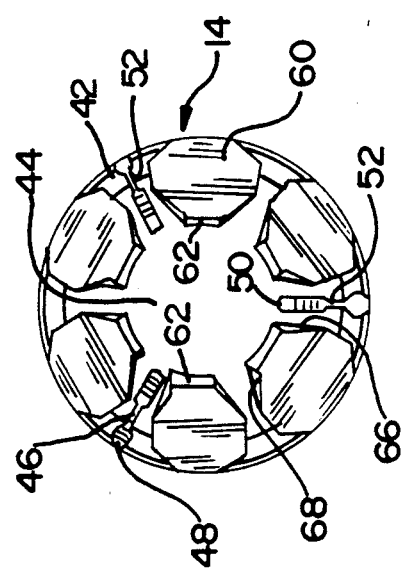

CONNECTOR FOR USE WITH METAL CLAD CABLE

FIELD OF THE INVENTION

The present invention relates to a connector for terminating a metal clad electrical cable having plural electrical conductors extending therethrough. It more particularly relates to an electrical connector having a grounding element which mechanically and electrically secures the metallic sheath of the cable to the connector body.

BACKGROUND OF THE INVENTION

Electrical cables of the metal clad type typically include an outer metallic sheath having an insulated jacket thereover and a plurality of individually insulated electrical conductors extending therethrough. The outer metallic sheath may include helical windings along its length to increase the flexibility of the cable. Metal clad cables of this type may be used for transmitting power and/or control signals for use in distribution centers, motors, panel boards and numerous other electrical and electromechanical apparatus.

Connectors which terminate such metal clad cables are designed for connecting the cable to an electrical box. Two requirements of this type of connector is that the connector provide an effective electrical ground between the metallic sheath of the cable and the electrical box and also provide a seal between the connector and the cable itself. The electrical connector art has seen a wide variety of connector structures which, in one fashion or another, achieve both results.

U.S. Pat. No. 4,490,576, issued Dec. 25, 1984 describes a connector for terminating jacketed metal clad cable where a grounding ring is employed to make mechanical and electrical engagement with the metallic sheath of the cable and establish continuity between the cable sheath and the connector itself. Grounding rings of this type typically include a plurality of inwardly projecting fingers which extend into contact with the metallic sheath of the cable upon insertion of the cable into the connector thus establishing electrical engagement therewith. While the fingers of the grounding ring are slightly resilient in order to permit accommodation of the cable therethrough, the fingers must provide sufficient clearance so as to not totally prevent insertion of the cable. Thus, the grounding ring must be dimensioned precisely to accommodate a cable sheath of a given diameter. Employing a cable sheath having a larger diameter then is appropriate for the grounding ring will result in the cable not being readily insertable into the connector. Similarly, employing a cable having a sheath of lesser diameter will result in an ineffective ground.

U S. Pat. No. 4,692,562, issued Sept. 8, 1987 addresses the need for providing an effective grounding and sealing member which will accommodate cables of different sizes. The connector described in the '562 patent employs a connector body having a frustoconically shaped internal bore and includes a correspondingly shaped grounding ring and sealing member. In its initial position, sufficient clearance is provided to permit insertion of the cable into the connector without engagement of the cable sheath with fingers of the grounding ring. Thus, a wide range of cable sizes may be accommodated in the connector. After cable insertion, a gland nut is tightened down forcing the grounding ring against the frustoconical bore and into engagement with the cable sheath.

While providing for accommodation of a wider range of cable sizes than the connector of the '576 patent, the connector of the '562 patent fails to provide initial ground contact between the grounding ring and the metallic sheath upon initial insertion of the cable into the connector. Thus, in situations where the cable gland nut inadvertently is not tightened down or not sufficiently tightened down to establish ground contact, ground connection will not be achieved between the cable and the electrical box thereby resulting in a potentially hazardous situation.

It is therefore desirable to provide an electrical connector which accommodates a wide range of sizes of metal clad cable and which provides initial grounding engagement with the cable upon insertion into the connector.

SUMMARY OF THE INVENTION

It is an object of the present invention to provide an electrical connector which mechanically and electrically connects a metal clad cable to an electrical box.

It is a more particular object to provide an electrical connector which accommodates a wide range of cable sizes and which initially grounds the metallic sheath of the cable upon insertion of the cable into the connector.

In the efficient attainment of the foregoing and other objects the present invention provides a connector for terminating an electrical cable having a conductive sheath. An elongate gland receives the cable in an axially extending central bore. A gland nut secures the cable in the connector gland. The connector further includes sheath grounding means movably supported within the gland for engagement with the cable sheath upon insertion of the cable into the connector. The sheath grounding means includes a first plurality of fingers extending inwardly for electrical and mechanical engagement with the sheath upon initial insertion of the cable into the connector. The sheath grounding means further includes a second plurality of fingers which are inwardly directed and which make secure mechanical and electrical engagement with the cable upon securement of the gland nut to the gland.

In the preferred embodiment shown herein, the sheath grounding means includes a perimetrical body having a central opening therethrough which accommodates the sheath of the cable. A plurality of elongate deflectable fingers extend from the body perimeter inwardly toward the central opening. Each of the fingers has a distal extent for engagement with the sheath and tapered side walls tapering toward the distal extent for engagement with a frustoconical portion of the bore of the connector gland. This engagement urges the fingers into mechanical and electrical engagement with the cable sheath upon connection of the gland nut to the gland.

BRIEF DESCRIPTION OF THE DRAWINGS

FIG. 1 is an exploded perspective view of the electrical connector of the present invention.

FIGS. 2 and 3 are front and rear views respectively of the grounding element of the connector of FIG. 1.

DETAILED DESCRIPTION OF THE PREFERRED EMBODIMENT

Figure 4:
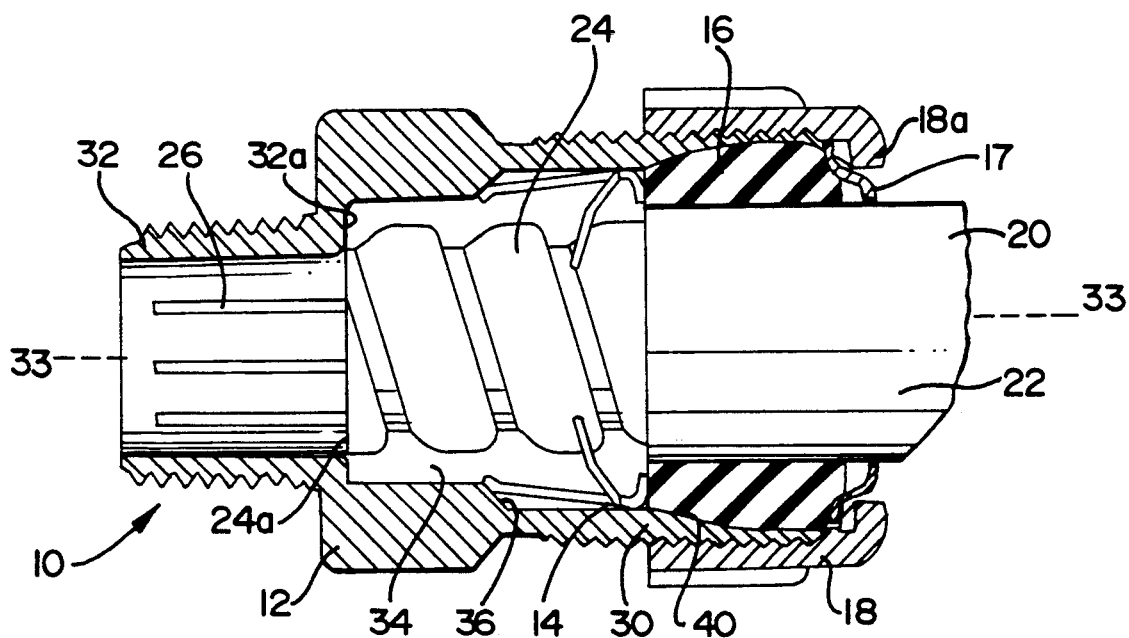
FIG. 4 is a longitudinal cross-sectional view of the connector of FIG. 1 with a metal clad cable inserted therein.

Referring to FIG. 1, a connector 10 of the present invention is shown. Connector 10 includes a connector body or gland 12, grounding element 14, a sealing bushing 16, a retaining washer 17 and a gland nut 18. Gland 12, grounding element 14, retaining washer 17 and gland nut 18 are formed of a suitably conductive metal, preferably aluminum. Sealing bushing 16 is formed of rubber or other suitable elastomer.

Figure 5:
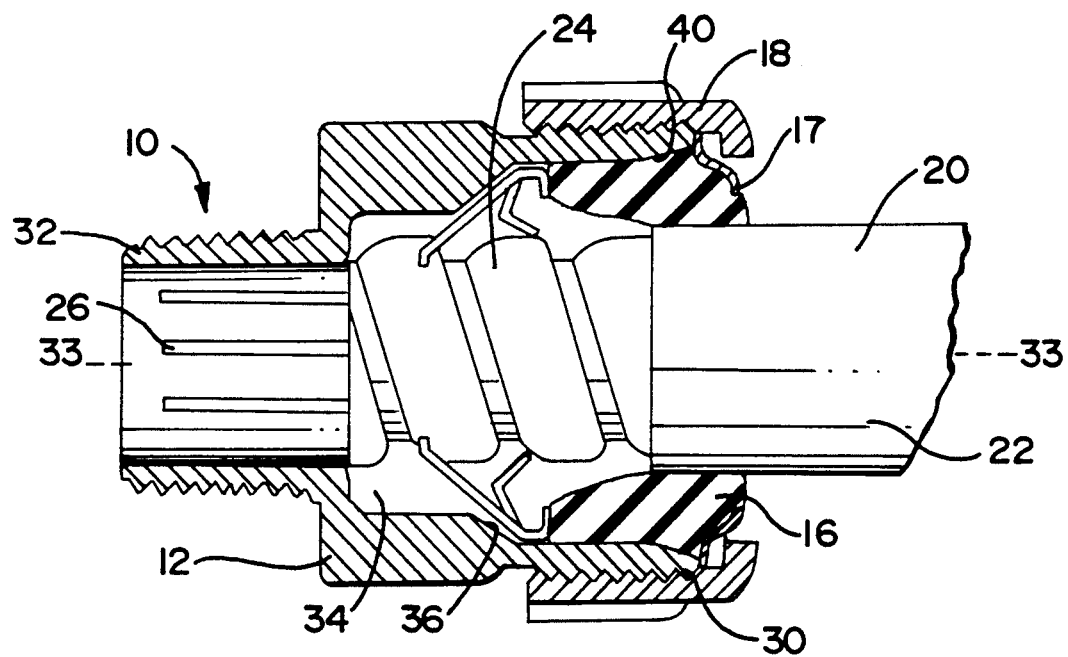
FIG. 5 is a longitudinal cross-sectional view of the connector and cable shown in FIG. 4 with the connector shown in a secured position.

Referring additionally to FIGS. 4 and 5, connector 10 terminates a metal clad cable 20 which includes an outer insulative jacket 22 surrounding a scroll type metallic cladding or sheath 24 and a plurality of individually insulated electrical conductors 26 which extend therethrough. In typical use the insulated jacket 22 is stripped back exposing an end extent of metallic sheath 24.

Connector gland 12 is an elongate hollow generally tubular member having an enlarged cable receiving end 30 which is externally screw threaded and a smaller opposed conductor egressing end 32 which is also externally screw threaded for screw engagement with an electrical box (not shown). An internal central bore 34 extends along axis 33 between cable receiving end 30 and conductor egressing end 32. Gland 12 further includes an internal frustoconical shoulder 36 which tapers from cable receiving end 30 toward conductor egressing end 32. Frustoconical shoulder 36 provides a reduction in the bore diameter between cable receiving end 30 and the conductor egressing end 32.

Gland nut 18 is generally an annular member having a hexagonal outer configuration and is internally screw threaded for screw cooperation with cable receiving end 30 of gland 12. The rear most end 18a is turned radially inwardly to define a flange of reduced diameter.

Sealing bushing 16 is generally an annular member having a forwardly tapering frustoconical end 38 and a rearwardly tapering opposed curved end 39. The frustoconical end 38 of sealing bushing 16 engages a chamfered end portion 40 of gland 12 adjacent cable receiving end 30. Screw engagement of gland nut 18 with gland 12 urges sealing bushing 16 toward conductor egressing end 32 of gland 12 and against chamfered end portion 40 to radially inwardly compress sealing bushing 16 about cable jacket 22 to provide an effective seal therebetween.

A ring-like retaining washer 17 is employed between the curved rear end 39 of sealing bushing 16 and flange 18a of gland nut 18 to assist in the axial movement and radial inward compression of sealing bushing 18 by reducing friction therebetween.

Grounding element 14 is positioned intermediate sealing bushing 16 and gland 12 and is movable toward conductor egressing end 32 of gland 12 upon movement of sealing bushing 16 in response to the screw engagement of gland nut 18 with gland 12.

Referring now to FIGS. 2 and 3, grounding element 14 may be described in further detail. Grounding element 14 includes an annular body 42 defining a central opening 44 therethrough. Three circumferentially spaced initial contact fingers 46 extend from annular body 42 radially inwardly toward central opening 44. Initial contact fingers 46 are elongate members having a proximal end 48 connected to annular body 42 an opposed distal extent 50. Between proximal end 48 and distal extent 50 is a central extent 52 of reduced thickness. As will be described in detail hereinbelow central extent 52 provides for bending of initial grounding fingers 46 thereat upon engagement with metallic sheath 24.

Proximal end 48 of fingers 46 is also of reduced thickness to provide for sufficient deflection of fingers 46 upon insertion of cable 20 into connector 10. The distal extents 50 of fingers 46 extend into central opening 44 in such a manner as to provide an interference engagement with metallic sheath 24 upon insertion therethrough. The reduced thickness of proximal end 48 permits sufficient deflection so that cables having various sized metallic sheaths may be inserted therethrough. A cable sheath of relatively small diameter will only slightly deflect fingers 46, while a cable having a larger diameter cable sheath will more fully deflect fingers 46. However, in each instance sufficient initial ground contact is maintained between fingers 46 and cable sheath 24. Thus, a "range-taking" feature is provided by grounding element 14.

Grounding element 14 further includes a set of permanent contact fingers 60 spaced circumferentially therearound. Permanent contact fingers 60 project radially inwardly and have curved distal extents 62 which lie along the circumference of an imaginary circle defined thereby. Each of fingers 60 includes a proximal extent 64 of reduced thickness (FIG. 1) secured to annular body 42 to permit deflection thereat.

In the present embodiment, each of permanent fingers 60 has a generally flat planar octagonal shape with the distal extent 62 bent inwardly toward opening 44. The octagonal shape of each of fingers 60 provides a pair of tapered side walls 66 and 68 tapering toward distal extent 62. As will be described in detail hereinbelow, the tapered side walls 66 and 68 engage the frustoconical shoulder 36 of central bore 34 upon urging of the grounding element 14 toward the conductor egressing end 32 of gland 12 to deflect permanent contact fingers 60 into engagement with metallic sheath 24.

FIGS. 1, 2 and 3 for clarity show permanent contact fingers 60 of grounding element 14 deflected inwardly toward central opening 44. However, in its initial state fingers 60 are positioned more outwardly as shown in FIG. 4.

Having described the components of connector 10, the termination of cable 20 in connector 10 may now be described.

Connector 10 is initially assembled as shown in FIG. 4. Grounding element 14 is inserted into cable receiving end 30 of gland 12. Sealing bushing 16 is then inserted behind grounding element 14. Gland nut 18, with retaining washer 17 in place, is partially screw connected to gland 12. The parts are thus held together in loose accommodation.

Cable 20 is prepared as above described having an exposed end extent of metallic sheath 24 extending from insulative jacket 22. If desired, connector 10 may be connected to a threaded opening in a electrical junction box (not shown). Cable 20 is then inserted into connector 10 through gland nut 18 and the cable receiving end 30 of gland 12. Upon insertion, metallic sheath 24 will engage initial contact fingers 46 causing slight resilient deflection of fingers 46 and establishing mechanical and electrical engagement therewith. Cable 20 is inserted until the outer edge 24a of metallic sheath 24 abuts an internal shoulder 32a of conductor egressing end 32. In this position, without the gland nut 18 tightened down onto gland 12, cable 20 is securely retained in connector 10 by the frictional engagement of the initial contact fingers 46 with the metallic sheath 24. In addition, adequate electrical continuity is established between connector 10 and metallic sheath 24 through initial contact fingers 46 so that if inadvertently gland nut 18 is not tightened down there will be no interruption of electrical continuity. After the installer has made proper electrical connection between the devices housed in the electrical box (not shown) and electrical conductors 26, the gland nut 18 may be tightened down to effect a seal between the cable 20 and the connector 10 and also establish permanent ground continuity between the metallic sheath 24 and the gland 12. Screw tightening of gland nut 18 may be accomplished by hand or with an appropriate tool.

FIG. 5 shows the effects of continued screw engagement of gland nut 18 with gland 12. Movement of gland nut 18 urges sealing bushing 16 toward conductor egressing end 32 of gland 12. Also, such movement causes sealing bushing 16 to radially compress around the insulative jacket 22 of cable 20 to form a seal therewith. Movement of sealing bushing 16 toward cable receiving end 30 urges grounding element 14 toward conductor egressing end 32. This movement prompts two simultaneous actions. As the distal extents 50 of initial contact fingers 46 are slightly embedded into metallic sheath 24, axial movement of grounding element 14 causes the central extent 52 to bend inwardly allowing for further axial progression of grounding element 14. As shown in FIG. 5, each of fingers 46 bends back onto itself permitting continued axial movement of grounding element 14.

In addition, permanent contact fingers 60 are urged against frustoconical shoulder 36 of central bore 34 causing permanent contact fingers 60 to deflect at reduced extent 64 (FIG. 1). The fingers 60 are driven radially inwardly so that curved distal extents 62 engage metallic sheath 24.

Since permanent contact fingers 60 are positioned in FIG. 4 in a non-engaged position with respect to metallic sheath 24 thereby providing ample clearance for insertion of cable 20 thereinto, a wide range of cable sizes may be accommodated by grounding element 14. Continued screw engagement of gland nut 18 with gland 12 will continuously urge permanent contact fingers 60 radially inwardly until adequate mechanical and electrical engagement is established with a metallic sheath 24 within a wide range of cable sizes.

As may be appreciated, fingers 60 are urged radially inwardly by progressive contact against an inwardly tapering surface formed by frustoconical shoulder 36. However, improved results over that of prior art devices are achieved by the particular shape of permanent contact fingers 60. As described above, fingers 60 include a pair of tapered side walls 66 and 68 tapering toward distal extent 62. These tapered side walls engage the frustoconical shoulder 36 causing increased radial inward movement of the fingers toward metallic sheath 24.

Figure 6:
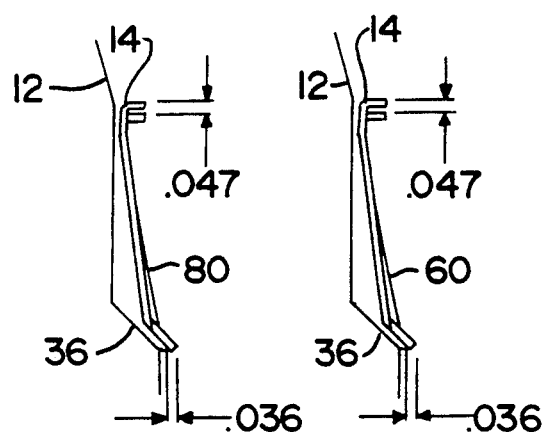
FIGS. 6 through 8 show in computer generated schematic representations, comparative movement of a conventional finger of the prior art and the contact finger of the present invention.
Figure 7:
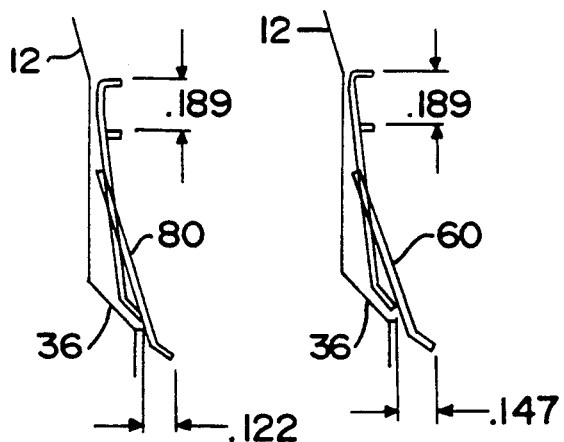
Figure 8:
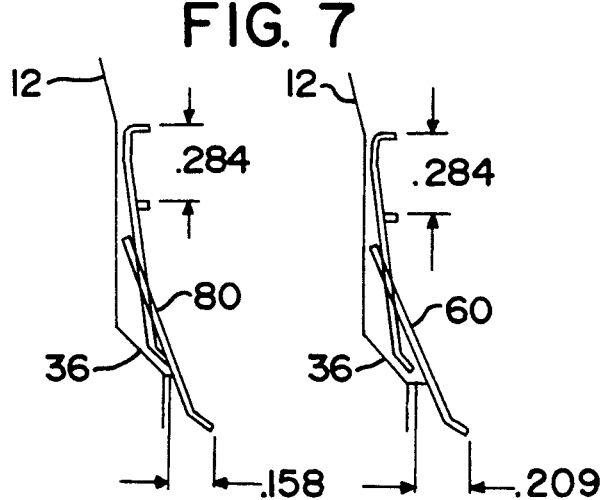

Shown in schematic fashion in FIGS. 6, 7 and 8 is a comparison between the operation of a conventional contact finger 80 of the prior art having parallel sidewalls and contact finger 60 of the present invention having tapered sidewalls as described hereinabove.

FIGS. 6, 7 and 8 are computer-aided-design drawings comparing the improved performance of particularly shaped contact finger of the present invention over conventional contact fingers. The left hand drawing in each of FIGS. 6, 7 and 8 represent movement of a conventional contact finger 80 against frustoconical shoulder 36 of gland 12 from an initial stationary position. The right hand drawings in each of FIGS. 6, 7 and 8 represent movement of contact finger 60 of the present invention from an initial stationary position.

In each illustration, contact fingers 80 and 60 are moved vertically (representing axial movement of grounding element 14 in gland 12), an identical distance. FIGS. 7 and 8 show that by identical vertical movement of contact fingers 80 and 60, increased horizontal movement (representing radial inward displacement of the contact finger) is achieved by contact fingers 60 of the present invention over that of contact fingers 80 of the prior art.

The computer aided example, especially with respect to FIGS. 7 and 8, shows that the particularly designed contact finger 60 of the present invention exhibits increased radial inward displacement upon axial progression of grounding element 14 in gland 12.

Referring specifically to the example shown in FIG. 8, axial movement of grounding element 14 a distance of 0.284 inches from its initial position would cause associated inward radial displacement of conventional ground finger 80 a distance of 0.158 inches from its initial position. This is compared with identical axial movement of the ground finger 60 (0.284 inches) which exhibits inward displacement of 0.209 inches.

It can be seen that the ground finger 60 of the present invention would engage sheath 24 of cable 20 (FIGS. 4 and 5) in much tighter engagement than would ground finger 80 of conventional construction.

Figure 9:
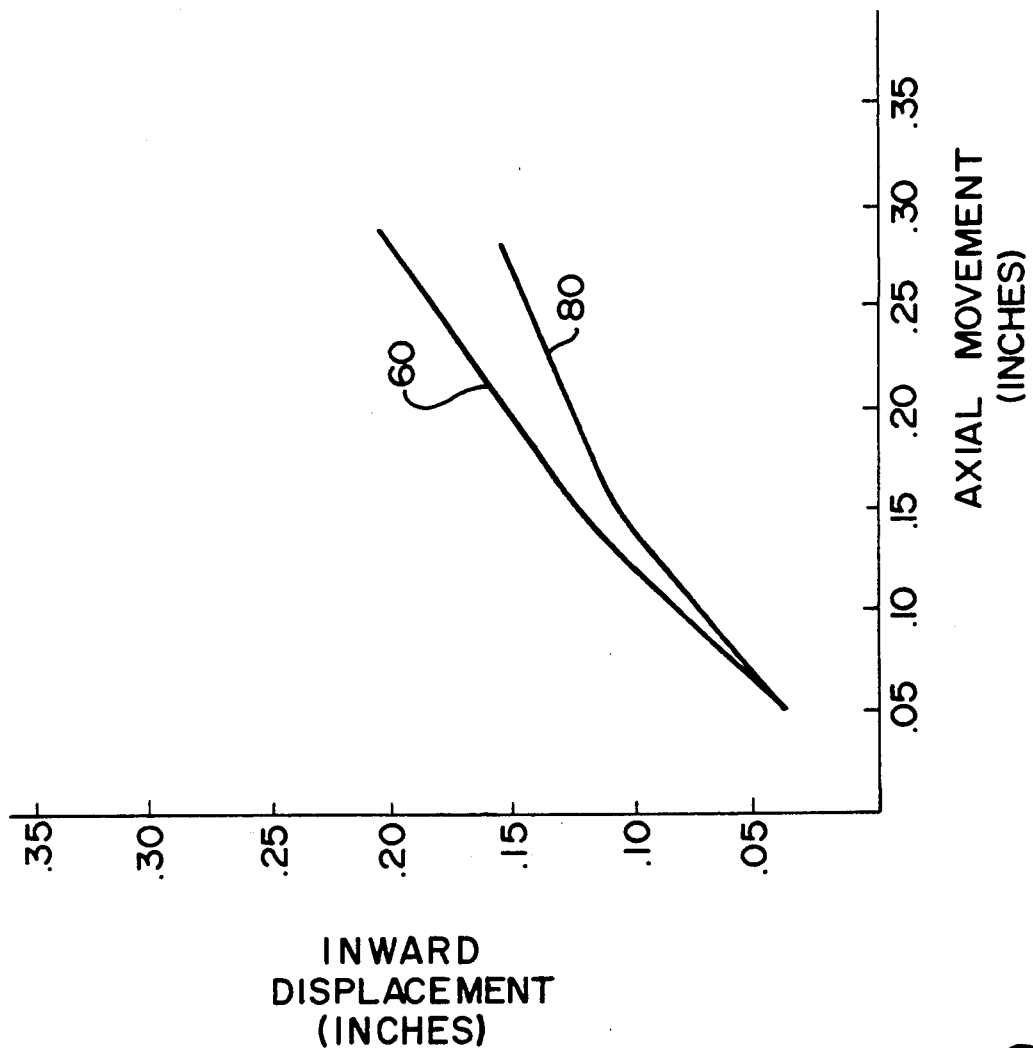
FIG. 9 is a graph comparing movement of the contact finger of the present invention and that of the prior art.

FIG. 9 shows graphically the improved results achieved with contact fingers 60 of the present invention. In this computer generated graph the X-axis represents axial movement of grounding bushing 14 while the Y-axis represents radial inward displacement of the grounding fingers. At each point along the X-axis, curve 60 representing the contact fingers of the present invention shows greater inward displacement (the Y-coordinate) over that of curve 80 representing contact fingers of the prior art.

Various changes to the foregoing described and shown structures would now be evident to those skilled in the art. Accordingly, the particularly disclosed scope of the invention is set forth in the following claims.

We claim:

1. A connector for terminating an electrical cable having a conductive sheath and a plurality of conductors extending therethrough comprising:
   an elongate gland having a cable receiving end, a conductor egressing and a longitudinal central bore axially extending therethrough for insertable receipt of said cable;
   a gland nut movably securable to said gland, said gland nut being axially movable from a position adjacent said cable receiving end of said gland toward said conductor egressing end;

sealing means movably supported between said gland and said gland nut for effecting a seal between said cable and said gland upon said axial movement of gland nut; and sheath grounding means movably supported within said gland adjacent said sealing means, said sheath grounding means being movable toward said conductors egressing end upon said axial movement of gland nut, said sheath grounding means further including an annular body having a first plurality of radially inwardly directed deflectable fingers of a first configuration for mechanical and electrical engagement with said cable sheath upon said insertable receipt of said cable, and a second plurality of radially inwardly directed deflectable fingers of a second configuration different from said first configuration for mechanical and electrical engagement with said cable sheath upon said axial movement of said gland nut with respect to said gland.

2. A connector of claim 1 wherein said cable receiving end of said gland is externally screw threaded and said gland nut is internally screw threaded for cooperative screw engagement.

3. A connector of claim 2 wherein said gland nut is axially movable toward said conductor egressing end of said gland upon said cooperative screw engagement of said gland with said gland nut.

4. A connector of claim 3 wherein said sealing member includes an annular deformable element which is axially movable toward said conductor egressing end of said gland and radially inwardly compressible upon said screw engagement of said gland with said gland nut for sealing engagement with said cable.

5. A connector of claim 4 wherein said gland includes a inner substantially cylindrical wall having an annular shoulder portion tapering toward said conductor egressing end.

6. A connector of claim 5 wherein upon said axial movement of said annular body of said sheath grounding means, said second plurality of deflectable fingers engage said tapered shoulder of said gland and are further inwardly deflected for mechanical and electrical engagement with said conductive sheath of said cable.

7. A connector of claim 6 wherein said second plurality of fingers are elongate members having one end supported by said annular body and an opposed distal end, and wherein said distal end includes a curved transverse end extent for engagement with said conductive sheath.

8. A connector of claim 7 wherein each of said distal ends of said second fingers includes tapered side walls tapering toward said end extent.

9. A connector of claim 6 wherein said first fingers are elongate members each having one end supported on said annular body, an opposed distal end and a central extent of reduced thickness.

10. A connector of claim 1 wherein said first configuration and said second configuration differ in that said first fingers extend from said annular body at a first angle and said second fingers extend from said annular body at a second angle different from said first angle.

11. A connector of claim 1 wherein said first configuration and said second configuration differ in that said first and second fingers have respectively differing shapes.

12. A connector for electrical cable having a metallic sheath and plural conductors extending therethrough, said connector comprising:

an elongate gland having an internal bore therethrough for accommodation of said cable, said bore having a frustoconical extent tapering toward one end of said gland;

sheath engagement means for mechanical and electrical engagement with said cable sheath; and urging means for moving said sheath engagement means into engagement with said cable sheath;

wherein said sheath engagement means further comprises:

a perimetrical body having a central opening therethrough;

a plurality of elongate deflectable fingers extending from said body perimeter inwardly toward said central opening, each said finger having a distal extent and tapered side walls tapering toward said distal extent for engagement with said frustoconical extent of said bore upon said movement of said urging means to urge said fingers into mechanical and electrical engagement with said cable sheath.

13. A connector of claim 12 wherein said distal extent of each said elongate deflectable finger includes a transverse portion between said side walls, said transverse portion being engageable with said sheath.

14. A connector of claim 13 wherein said cable sheath is cylindrical and wherein said transverse portions of said fingers are curved.

15. A connector of claim 14 wherein said perimetrical body is annular and said plural fingers are spaced circumferentially around said annular body.

16. A connector of claim 15 wherein each of said fingers includes a proximal extent opposed to said distal extent which is supported on said annular body.

17. A connector of claim 16 wherein said proximal extent of each of said finger is of reduced thickness to permit deflection of said fingers thereat.

* * * * *